US009234690B2

(12) United States Patent
McCollough et al.

(10) Patent No.: US 9,234,690 B2
(45) Date of Patent: Jan. 12, 2016

(54) ICE MAKER FOR A REFRIGERATION APPLIANCE

(71) Applicant: Electrolux Home Products, Inc., Charlotte, NC (US)

(72) Inventors: Thomas W. McCollough, Anderson, SC (US); Nilton Carlos Bertolini, Anderson, SC (US); Justin Morgan, Anderson, SC (US); Dennis Carl Hansen, Anderson, SC (US)

(73) Assignee: ELECTROLUX HOME PRODUCTS, INC., Charlotte, NC (US)

( * ) Notice: Subject to any disclaimer, the term of this patent is extended or adjusted under 35 U.S.C. 154(b) by 310 days.

(21) Appl. No.: 13/755,216

(22) Filed: Jan. 31, 2013

(65) Prior Publication Data
US 2013/0192279 A1 Aug. 1, 2013

Related U.S. Application Data

(60) Provisional application No. 61/592,913, filed on Jan. 31, 2012.

(51) Int. Cl.
| | |
|---|---|
| *F25C 5/18* | (2006.01) |
| *F25C 1/12* | (2006.01) |
| *F25D 21/08* | (2006.01) |
| *F25C 5/00* | (2006.01) |

(52) U.S. Cl.
CPC . *F25C 1/12* (2013.01); *F25C 5/007* (2013.01); *F25C 5/182* (2013.01); *F25D 21/08* (2013.01); *F25B 2600/112* (2013.01); *F25C 5/005* (2013.01); *F25C 2400/10* (2013.01); *F25D 2317/061* (2013.01); *Y02B 40/32* (2013.01)

(58) Field of Classification Search
CPC ...... F25C 5/005; F25C 5/007; F25C 2400/10; F16B 2/04; F16B 2/20; F16B 17/00; F16B 21/086
See application file for complete search history.

(56) References Cited

U.S. PATENT DOCUMENTS

| | | | |
|---|---|---|---|
| 3,874,559 A | | 4/1975 | Pink |
| 4,646,536 A | | 3/1987 | Yamada et al. |
| 4,973,212 A | * | 11/1990 | Jacobs .......................... 411/508 |

(Continued)

FOREIGN PATENT DOCUMENTS

EP   1 850 078 A2   10/2007

OTHER PUBLICATIONS

International Search Report of Corresponding PCT Application No. PCT/US2013/024034; Dated Apr. 11, 2013.

*Primary Examiner* — Mohammad M Ali
*Assistant Examiner* — Christopher R Zerphey
(74) *Attorney, Agent, or Firm* — Pearne & Gordon LLP

(57) ABSTRACT

A refrigeration appliance includes a fresh food compartment, a freezer compartment, and an ice maker within the fresh food compartment for freezing water into ice pieces. In one example, a rotatable auger drives the ice pieces out of a removable ice bin via a driving force applied in a first direction. A latch is configured to apply a resisting force to the ice bin along a second direction. In another example, an air mover is disposed within the ice maker for delivering cooled air from an ice maker evaporator to a region adjacent to the ice bin. At least one air channel is formed into an inside surface of the ice maker chamber. In another example, a method of making ice in the refrigeration appliance is provided. The method includes the steps of operating the air mover and a defrost heating of the ice maker evaporator.

15 Claims, 11 Drawing Sheets

(56) References Cited

U.S. PATENT DOCUMENTS

| | | |
|---|---|---|
| 5,272,888 A | 12/1993 | Fisher et al. |
| 6,058,723 A | 5/2000 | Kusunoki et al. |
| 6,772,597 B1 | 8/2004 | Zentner et al. |
| 6,817,195 B2 | 11/2004 | Rafalovich et al. |
| 7,284,390 B2 | 10/2007 | Van Meter et al. |
| 7,337,620 B2 | 3/2008 | Coulter et al. |
| 7,552,594 B2 | 6/2009 | Coulter et al. |
| 7,594,413 B2 | 9/2009 | Martin et al. |
| 7,614,244 B2 | 11/2009 | Venkatakrishnan et al. |
| 7,726,148 B2 | 6/2010 | Martin et al. |
| 7,744,173 B2 | 6/2010 | Maglinger et al. |
| 7,806,491 B2 | 10/2010 | Lee et al. |
| 7,870,754 B2 | 1/2011 | Martin et al. |
| 7,942,014 B2 | 5/2011 | Rafalovich et al. |
| 7,963,120 B2 | 6/2011 | An et al. |
| 8,074,464 B2 | 12/2011 | Venkatakrishnan et al. |
| 8,371,136 B2 | 2/2013 | Venkatakrishnan et al. |
| 2003/0172664 A1* | 9/2003 | Collins et al. .................. 62/137 |
| 2005/0132739 A1* | 6/2005 | Sannasi et al. .................. 62/344 |
| 2007/0220909 A1* | 9/2007 | An et al. .................. 62/137 |
| 2008/0011010 A1 | 1/2008 | Koons et al. |
| 2009/0133428 A1* | 5/2009 | An et al. .................. 62/320 |
| 2009/0249822 A1 | 10/2009 | Lee et al. |
| 2009/0293501 A1 | 12/2009 | Kulkarni et al. |
| 2010/0175412 A1* | 7/2010 | Kim .................. 62/320 |
| 2010/0218540 A1 | 9/2010 | McCollough et al. |
| 2010/0287970 A1* | 11/2010 | Choi .................. 62/344 |
| 2011/0067430 A1 | 3/2011 | Martin et al. |
| 2011/0203305 A1 | 8/2011 | Schenk et al. |
| 2011/0302950 A1 | 12/2011 | Hawkins et al. |
| 2012/0304684 A1 | 12/2012 | Shaha et al. |

* cited by examiner

ICE MAKER FOR A REFRIGERATION APPLIANCE

CROSS-REFERENCE TO RELATED APPLICATIONS

This application claims the benefit of U.S. Provisional Application No. 61/592,913, filed Jan. 31, 2012, the entire disclosure of which is hereby incorporated herein by reference.

FIELD OF THE INVENTION

This application relates generally to an ice maker for a refrigeration appliance, and more particularly, to a refrigeration appliance including an ice maker disposed within a food-storage compartment of a refrigerator that is maintained at a temperature above a freezing temperature of water at atmospheric conditions, and a method of controlling the ice maker to produce ice.

BACKGROUND OF THE INVENTION

Conventional refrigeration appliances, such as domestic refrigerators, typically have both a fresh food compartment and a freezer compartment or section. The fresh food compartment is where food items such as fruits, vegetables, and beverages are stored and the freezer compartment is where food items that are to be kept in a frozen condition are stored. The refrigerators are provided with a refrigeration system that maintains the fresh food compartment at temperatures above 0° C. and the freezer compartments at temperatures below 0° C.

The arrangements of the fresh food and freezer compartments with respect to one another in such refrigerators vary. For example, in some cases, the freezer compartment is located above the fresh food compartment and in other cases the freezer compartment is located below the fresh food compartment. Additionally, many modern refrigerators have their freezer compartments and fresh food compartments arranged in a side-by-side relationship. Whatever arrangement of the freezer compartment and the fresh food compartment is employed, typically, separate access doors are provided for the compartments so that either compartment may be accessed without exposing the other compartment to the ambient air.

Such conventional refrigerators are often provided with a unit for making ice pieces, commonly referred to as "ice cubes" despite the non-cubical shape of many such ice pieces. These ice making units normally are located in the freezer compartments of the refrigerators and manufacture ice by convection, i.e., by circulating cold air over water in an ice tray to freeze the water into ice cubes. Storage bins for storing the frozen ice pieces are also often provided adjacent to the ice making units. The ice pieces can be dispensed from the storage bins through a dispensing port in the door that closes the freezer to the ambient air. The dispensing of the ice usually occurs by means of an ice delivery mechanism that extends between the storage bin and the dispensing port in the freezer compartment door.

However, for refrigerators such as the so-called "bottom mount" refrigerator, which includes a freezer compartment disposed vertically beneath a fresh food compartment, placing the ice maker within the freezer compartment is impractical. Users would be required to retrieve frozen ice pieces from a location close to the floor on which the refrigerator is resting. And providing an ice dispenser located at a convenient height, such as on an access door to the fresh food compartment, would require an elaborate conveyor system to transport frozen ice pieces from the freezer compartment to the dispenser on the access door to the fresh food compartment. Thus, ice makers are commonly included in the fresh food compartment of bottom mount refrigerators, which creates many challenges in making and storing ice within a compartment that is typically maintained above the freezing temperature of water. Operation of such ice makers may be affected by temperature fluctuations and other events occurring within the fresh food compartments housing the ice makers, and prolonged exposure of the ice to the ambient environment of the fresh food compartment can result in partial melting of ice pieces. Further, assembly of such refrigerators can be complex and labor intensive due in part to the measures that must be taken to store ice pieces within the fresh food compartment.

Accordingly, there is a need in the art for a refrigerator including an ice maker disposed within a compartment of the refrigerator in which a temperature is maintained above 0° C. for a substantial period of time during which the refrigerator is operational.

BRIEF SUMMARY OF THE INVENTION

The following presents a simplified summary of the invention in order to provide a basic understanding of some example aspects of the invention. This summary is not an extensive overview of the invention. Moreover, this summary is not intended to identify critical elements of the invention nor delineate the scope of the invention. The sole purpose of the summary is to present some concepts of the invention in simplified form as a prelude to the more detailed description that is presented later.

In accordance with one aspect, a refrigeration appliance comprises a fresh food compartment for storing food items in a refrigerated environment having a target temperature above zero degrees Centigrade, and a freezer compartment for storing food items in a sub-freezing environment having a target temperature below zero degrees Centigrade. An ice maker is disposed within the fresh food compartment for freezing water into ice pieces, and the ice maker comprises a removable ice bin for storing the ice pieces produced by the ice maker. A rotatable auger is positioned within the ice bin and configured to drive the ice pieces out of the ice bin via a driving force applied in a first direction. A latch is configured to apply a resisting force to the ice bin along a second direction generally opposed to the first direction sufficient to counteract the driving force. The resisting force is less than a removal force applied by a user to remove the ice bin from the ice maker.

In accordance with another aspect, a refrigeration appliance comprises a fresh food compartment for storing food items in a refrigerated environment having a target temperature above zero degrees Centigrade, and a freezer compartment for storing food items in a sub-freezing environment having a target temperature below zero degrees Centigrade. An ice maker is disposed within the fresh food compartment for freezing water into ice pieces. The ice maker comprises an ice maker chamber with a first end and a second end and containing an ice bin for storing the ice pieces produced by the ice maker. A refrigeration system comprises a system evaporator for providing a cooling effect to at least one of the fresh food and freezer compartments, and an ice maker evaporator is disposed in the ice maker chamber that is dedicated to provide air cooled to a temperature below zero degrees Centigrade to the ice maker. An air mover is disposed within the ice maker and adjacent the second end of the ice maker chamber for delivering the cooled air from the ice maker evaporator to a region adjacent to the ice bin. At least one air channel is formed into an inside surface of the ice maker chamber adjacent the first end and extending vertically between an upper surface of the ice bin towards a lower surface of the ice bin.

In accordance with another aspect, a method of making ice in a refrigeration appliance, comprising the step of introducing water into a water tray of an ice maker disposed within a fresh-food compartment configured to store food items at a temperature above zero degrees Centigrade. The method further comprises the step of operating an ice maker evaporator that is dedicated for providing air cooled to a temperature below zero degrees Centigrade to achieve a cooling effect to the water in the water tray sufficient for freezing the water into ice pieces. The ice maker further comprises an ice bin for storing the ice pieces produced by the ice maker, and the ice maker evaporator comprises a defrost heating element that is operable to melt frost accumulated on a surface of the ice maker evaporator. The method further comprises the step of operating an air mover disposed within the ice maker for a predetermined amount of time for delivering the air cooled by the ice maker evaporator to at least one of the water tray and the ice bin. The method further comprises the step of subsequently stopping operation of the air mover and operating the defrost heating element to thereby melt frost accumulated on the surface of the ice maker evaporator.

It is to be understood that both the foregoing general description and the following detailed description present example and explanatory embodiments of the invention, and are intended to provide an overview or framework for understanding the nature and character of the invention as it is claimed. The accompanying drawings are included to provide a further understanding of the invention and are incorporated into and constitute a part of this specification. The drawings illustrate various example embodiments of the invention, and together with the description, serve to explain the principles and operations of the invention.

BRIEF DESCRIPTION OF THE DRAWINGS

The foregoing and other aspects of the present application will become apparent to those skilled in the art to which the present application relates upon reading the following description with reference to the accompanying drawings, in which.

DESCRIPTION OF EXAMPLE EMBODIMENTS

Figure 1:
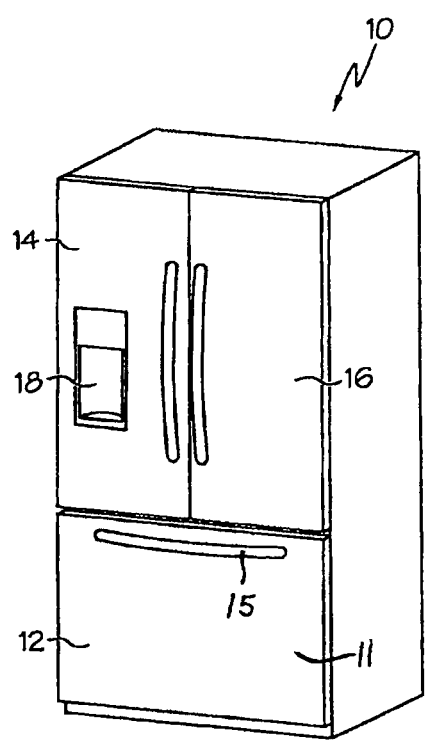
FIG. 1 illustrates a perspective view of an embodiment of a refrigerator including an ice maker disposed in a fresh food compartment.

Example embodiments that incorporate one or more aspects of the present application are described and illustrated in the drawings. These illustrated examples are not intended to be a limitation on the present application. For example, one or more aspects of the present application can be utilized in other embodiments and even other types of devices. Moreover, certain terminology is used herein for convenience only and is not to be taken as a limitation on the present application. Still further, in the drawings, the same reference numerals are employed for designating the same elements.

Figure 2:
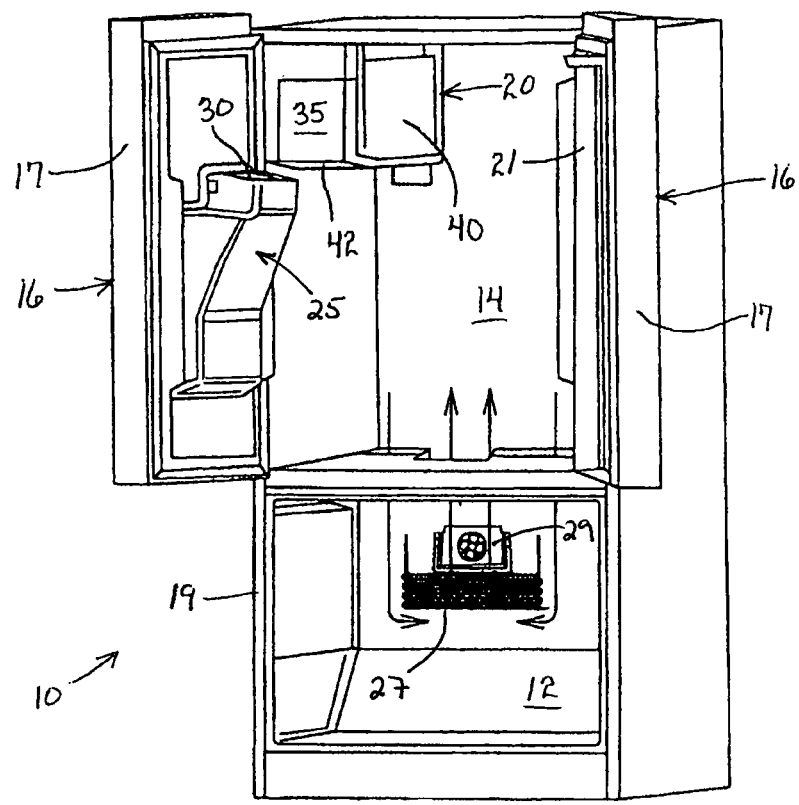
FIG. 2 illustrates a perspective view of an embodiment of a refrigerator including an ice maker disposed in a fresh food compartment with French doors providing access into the fresh food compartment.

Referring to FIG. 1, there is illustrated a refrigeration appliance in the form of a domestic refrigerator, indicated generally at 10. Although the detailed description that follows concerns a domestic refrigerator 10, the invention can be embodied by refrigeration appliances other than with a domestic refrigerator 10. Further, an embodiment is described in detail below, and shown in the figures as a bottom-mount configuration of a refrigerator 10, including a fresh-food compartment 14 disposed vertically above a freezer compartment 12. However, the refrigerator 10 can have any desired configuration including at least a fresh food compartment 14 and an ice maker 20 (FIG. 2). Various examples of such a domestic refrigerator are disclosed in application Ser. No. 11/331,732, filed on Jan. 13, 2006, and Ser. No. 12/713,725, filed on Feb. 26, 2010 both of which are incorporated in their entirety herein by reference.

One or more doors 16 shown in FIG. 1 are pivotally coupled to a cabinet 19 of the refrigerator 10 to restrict and grant access to the fresh food compartment 14. The door 16 can include a single door that spans the entire lateral distance across the entrance to the fresh food compartment 14, or can include a pair of French-type doors 16 as shown in FIG. 1 that collectively span the entire lateral distance of the entrance to the fresh food compartment 14 to enclose the fresh food compartment 14. For the latter configuration, a center mullion 21 (FIG. 2) is pivotally coupled to at least one of the doors 16 to establish a surface against which a seal provided to the other one of the doors 16 can seal the entrance to the fresh food compartment 14 at a location between opposing side surfaces 17 (FIG. 2) of the doors 16. The mullion can be pivotally coupled to the door 16 to pivot between a first orientation that is substantially parallel to a planar surface of the door 16 when the door 16 is closed, and a different orientation when the door 16 is opened. The externally-exposed surface of the center mullion 21 is substantially parallel to the door 16 when the center mullion 21 is in the first orientation, and forms an angle other than parallel relative to the door 16 when the center mullion 21 is in the second orientation. The seal and the externally-exposed surface of the mullion 21 cooperate approximately midway between the lateral sides of the fresh food compartment 14.

A dispenser 18 for dispensing at least ice pieces, and optionally water can be provided to one of the doors 16 that restricts access to the fresh food compartment 14 shown in FIG. 1. The dispenser 18 includes a lever, switch, proximity sensor or other device that a user can interact with to cause frozen ice pieces to be dispensed from an ice bin 35 (FIG. 2) provided to an ice maker 20 disposed within the fresh food compartment 14 through the door 16. Ice pieces from the ice bin 35 can be delivered to the dispenser via an ice chute 25, which extends at least partially through the door 16 between the dispenser 18 and the ice bin 35.

Referring once again to FIG. 1, the freezer compartment 12 is arranged vertically beneath the fresh food compartment 14. A drawer assembly (not shown) including one or more freezer baskets (not shown) can be withdrawn from the freezer compartment 12 to grant a user access to food items stored in the freezer compartment 12. The drawer assembly can be coupled to a freezer door 11 that includes a handle 15. When a user grasps the handle 15 and pulls the freezer door 11 open, at least one or more of the freezer baskets is caused to be at least partially withdrawn from the freezer compartment 12.

The freezer compartment 12 is used to freeze and/or maintain articles of food stored in the freezer compartment 12 in a frozen condition. For this purpose, the freezer compartment 12 is in thermal communication with an icemaker evaporator (FIG. 2) that removes thermal energy from the freezer compartment 12 to maintain the temperature therein at a temperature of 0° C. or less during operation of the refrigerator 10 in a manner described below.

The fresh food compartment 14 located in the upper portion of the refrigerator 10 in this example, serves to minimize spoiling of articles of food stored therein by maintaining the temperature in the fresh food compartment 14 during operation at a cool temperature that is typically less than an ambient temperature of the refrigerator 10, but somewhat above 0° C., so as not to freeze the articles of food in the fresh food compartment 14. According to some embodiments, cool air from which thermal energy has been removed by the icemaker evaporator can also be blown into the fresh food compartment 14 to maintain the temperature therein at a cool temperature that is greater than 0° C. For alternate embodiments, a separate evaporator can optionally be dedicated to separately maintaining the temperature within the fresh food compartment 14 independent of the freezer compartment 12. According to an embodiment, the temperature in the fresh food compartment can be maintained at a cool temperature within a close tolerance of a range between 0° C. and 4.5° C., including any subranges and any individual temperatures falling with that range. For example, other embodiments can optionally maintain the cool temperature within the fresh food compartment 14 within a reasonably close tolerance of a temperature between 0.25° C. and 4° C.

The refrigerator 10 further includes a refrigeration system comprising a system evaporator 27 for providing a cooling effect to at least one of the fresh food and freezer compartments. An embodiment of the system evaporator 27 for cooling air for both the freezer compartment 12 and the fresh food compartment 14 is shown in FIG. 2. The system evaporator 27 is supported within the freezer compartment 12, and an electric fan 29 is located adjacent to the system evaporator 27. In one example, operation of the electric fan 29 draws the airflow upward over the fins and coils of the system evaporator 27, and then in a forward direction, generally parallel to the ceiling portion of the freezer compartment 12 and toward a front of the freezer compartment 12. A cover (not shown) positioned in front of the horizontally-oriented electric fan 29 redirects at least a portion of the horizontal airflow generally upward through a cool air duct to be reintroduced into the fresh food compartment 14.

The system evaporator 27 is included as part of a refrigeration circuit provided to the refrigerator 10 for removing thermal energy from air to be used for controlling temperatures in at least one of the fresh food compartment 14 and the freezer compartment 12, and also for reducing a temperature of an ice maker evaporator 50 (FIG. 3) for freezing water into the ice pieces and for maintaining a temperature in the ice bin 35 provided to the ice maker 20. In one example, the refrigeration circuit includes a variable-speed compressor for compressing gaseous refrigerant to a high-pressure refrigerant gas. The compressor can optionally be infinitely variable, or can be varied between a plurality of predetermined, discrete operational speeds depending on the demand for cooling. The high-pressure refrigerant gas from the compressor can be conveyed through a suitable conduit such as a copper tube to a condenser, which cools the high-pressure refrigerant gas and causes it to at least partially condense into a liquid refrigerant. From the condenser, the liquid refrigerant can optionally be transported through an eliminator tube that is embedded within a portion of the center mullion 21 (FIG. 2). The liquid refrigerant flowing through the eliminator tube elevates the temperature of the external surface of the center mullion 21 to minimize the condensation of moisture from an ambient environment of the refrigerator 10 thereon. Alternatively, an electric AC or DC mullion heater can be utilized to control condensation on the center mullion 21. According to alternate embodiments, the refrigerator 10 includes a humidity sensor for sensing a humidity of an ambient environment in which the refrigerator 10 is in use, and controlling operation of the eliminator tube or mullion heater.

In operation, the compressor compresses the substantially-gaseous refrigerant to a high pressure, high-temperature refrigerant gas. As this refrigerant travels through the condenser it cools and condenses into a high-pressure liquid refrigerant. The refrigerator subsequently enters the system evaporator 27, where the refrigerant expands and at least partially evaporates into a gas. During this phase change, the latent heat of vaporization is extracted from air being directed over fins and coils of the system evaporator 27, thereby cooling the air to be directed by the electric fan 29 into at least one of the freezer compartment 12 and the fresh food compartment 14. This cooled air brings the temperature within the respective compartment to within an acceptable tolerance of a target temperature. From the system evaporator 27, the refrigerator flows to the ice maker evaporator 50. In one example, the ice maker evaporator 50 is arranged in series with the system evaporator 27. Thus, operation of the system evaporator 27 to cool the freezer compartment 12 and the fresh food compartment 14 also causes the ice maker evaporator 50 to provide air cooled to a temperature below zero degrees Centigrade to the ice maker 20. An air mover 52, such as a fan, can drive airflow over the ice maker evaporator 50 to achieve a cooling effect to the water in the water tray sufficient for freezing the water into ice pieces and also to the ice pieces stored in the ice bin 35 to minimize melting of those ice pieces. From the ice maker evaporator 50, the refrigerant returns to the compressor. It is contemplated that various control valves, pressure regulators, dryers, accumulators, etc. can be provided in between the system evaporator and the ice maker evaporator 50, and/or the ice maker evaporator 50 and the compressor.

An illustrative embodiment of the ice maker 20 disposed within the fresh food compartment 14 of the refrigerator 10 is shown in FIG. 2. The ice maker 20 can be secured within the fresh food compartment using any suitable fastener, and includes a removable or non-removable cover 40 for providing thermal insulation between the fresh food compartment 14 and the interior of the ice maker 20. Further, the cover 40 can include a substantially planar partition that can be removably or non-removably coupled to a lateral side of the ice maker 20, can have a generally "L" shaped appearance when viewed on end so as to enclose a lateral side and bottom portion of the ice maker 20 when installed, can have a generally "U" shaped appearance when viewed on end so as to enclose both lateral sides and the bottom portion of the ice maker 20 when installed, or any other desired shape. Such embodiments of the insulated cover 40 can include the side and bottom portions monolithically formed as a single unit. According to alternate embodiments, the insulated cover 40 can include a plurality of insulated panels that are spaced apart from each other to establish a passageway between the individual insulated panels through which ice pieces can be dispensed from the ice maker 20. Such embodiments can eliminate the need to form complex panels that define the entire perimeter of an ice-dispensing aperture through which ice can be dispensed from the ice maker 20. For example, a bottom insulated panel for insulating a bottom portion of the ice maker 20 can be spaced rearward, into the fresh food compartment, from a front insulated panel that opposes a door restricting access into the fresh food compartment and insulates a front portion of the ice maker 20. The resulting space between the front and bottom insulated panels forms an aperture through which ice pieces can be dispensed.

Various perspective and side views of the ice maker 20 removed from the interior of the fresh food compartment 14 are illustrated in the drawings. The ice maker 20 includes a generally rectangular frame defining an ice making chamber in which an ice making assembly is disposed. The frame is equipped with a plurality of receivers compatible with the fasteners used to secure the ice maker 20 within the fresh food compartment 14 of the refrigerator 10. The ice bin and the cover 40 can be selectively removed from and secured to the frame as desired. Although the cover 40 provides a degree of insulation between the ice making chamber of the ice maker 20 and the fresh food compartment 14, its construction may inhibit a hermetic seal from being formed between the ice making chamber and fresh the food compartment 14. In other words, the cover 40 can optionally allow minimal amounts of thermal energy transfer to occur between the ice making chamber of the ice maker 20 and the fresh food compartment 14. The cover 40 can optionally be removably secured in place on the ice maker 20 by releasable mechanical fasteners that can be removed using a suitable tool, examples of which include screws, nuts and bolts; or any suitable friction fitting possibly including a system of tabs allowing removal of the cover 40 from the ice maker 20 by hand and without tools. Alternatively, the cover 40 can optionally be non-removably secured in place on the ice maker 20, such as via adhesives, welding, non-removable fasteners, etc. In various other examples, a hidden latch is desirable for cosmetic and ergonomic reasons. The appearance of ice bin 35 front can be clean with only a hand-hold on the side. There can be few or no discontinuities in the surface for the purpose of exposed latches or levers.

Figure 3:
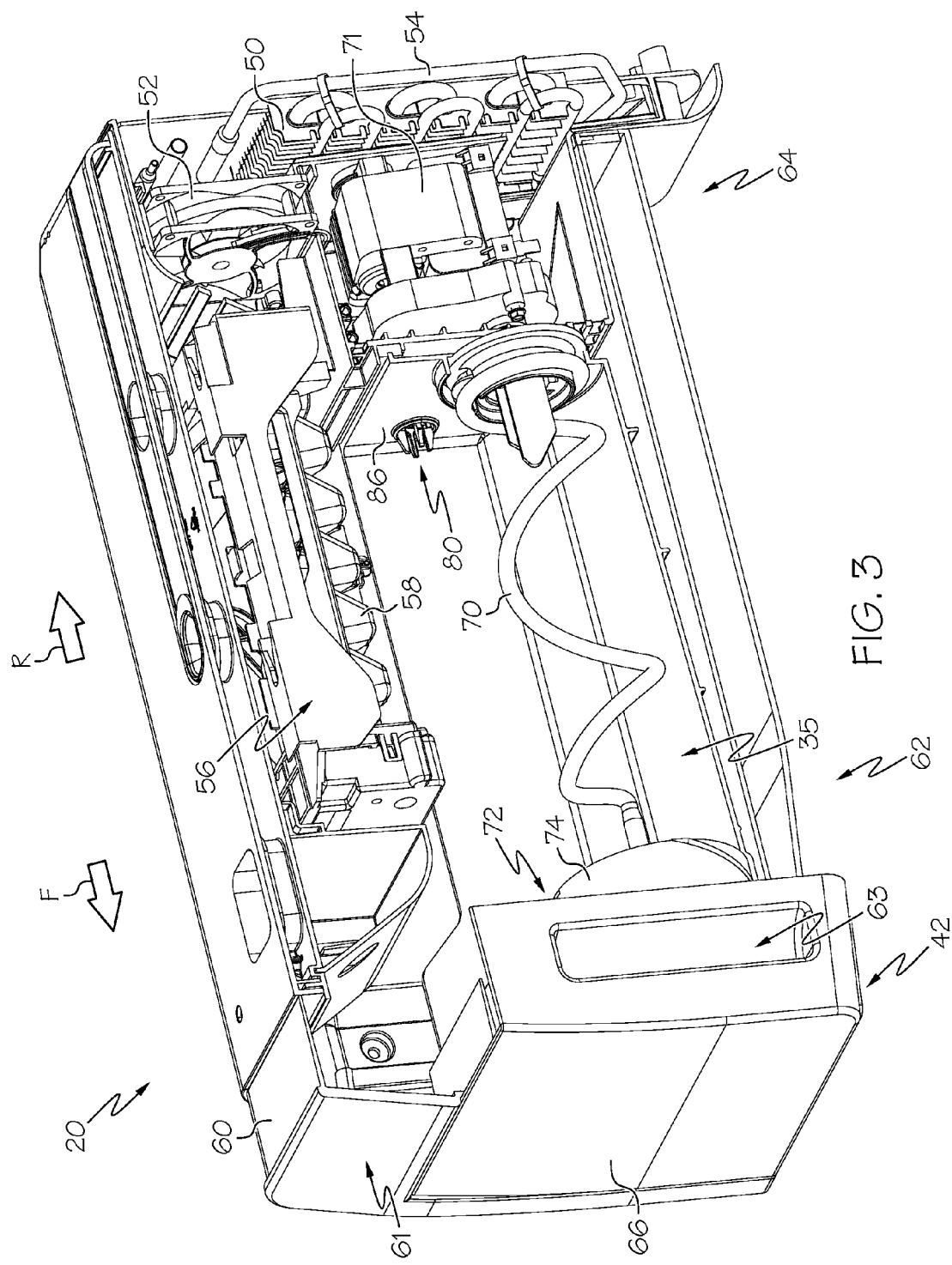
FIG. 3 is a perspective, partial-sectional view of an example ice maker.

FIG. 3 illustrates an embodiment of an ice making assembly 56 for freezing water into the ice pieces. The ice making assembly 56 is shown supported adjacent to a ceiling within the ice making chamber 20. The ice making assembly 56 includes a water tray 58 or mold for storing water to be frozen into the ice pieces. In one example, the ice making assembly 56 can comprise a twist-tray type, in which the water tray 58 is rotated upside down and twisted along its longitudinal axis to thereby break the frozen ice pieces free from the ice reservoirs of the water tray 58 where they fall into the ice bin 35 located below the water tray 58. Still, a conventional metal water tray with a plurality of sweeper-arms and a harvest heater for partially melting the ice pieces, or even other types of ice maker assemblies like the finger-evaporator type, could also be utilized. The ice making assembly 56 includes a bail arm for sensing the presence of ice pieces within the ice bin 35, and a driver, which includes an electric motor, for example, for driving the water tray 58 between an ice-making position and an ice-harvesting position. A thermistor or other suitable temperature sensor operatively connected to the controller can be coupled to the water tray 58, such as embedded within a recess formed in the water tray 58, for determining the freezing status of the water contained in the water tray 58 to facilitate ice harvesting. One or more switches can also be provided to the ice making assembly to determine when the mold has reached a travel limit. The bail arm can actuate a switch to signify an upper limit and/or absence of ice pieces in the ice bin.

The ice bin 35 can optionally be removably installed in the ice maker 20 to grant access to ice pieces stored therein. An aperture 42 formed along a bottom surface of the ice bin 35 is aligned with the aperture 30 leading into the ice chute 25 when the door 16 including the dispenser 18 is closed and allows for frozen ice pieces stored therein to be conveyed to the ice chute 25 and dispensed by the dispenser 18. A rotatable auger can extend along a length of the ice bin 35 can optionally be provided to be rotated and urge ice towards the aperture 42 formed along the bottom surface adjacent a front portion of the ice bin 35 to be transported to the ice chute 25 and dispenser 18. The auger can optionally be automatically activated and rotated by an electric motor in response to a request for ice pieces initiated by the user at the dispenser 18.

Turning now to FIGS. 3-6, various examples of the ice maker 20 are illustrated. FIG. 3 is a perspective, partial-sectional view of the ice maker 20 with at least part of the cover 40 removed to show internal details. The ice maker 20 generally includes an ice maker chamber 60 with a first end 62 located towards the front (i.e., a front side generally accessible by a user) and a second end 64 located towards the rear. The ice maker chamber 60 can be defined by the cover 40 and/or other similar sides, and may be insulated or non-insulated. Generally, the ice maker chamber 60 includes the ice maker evaporator 50, air mover 52, ice making assembly 56, and ice bin 35 for storing the ice pieces produced by the ice maker 20. The ice bin 35 can include a front cover 66 located towards the first end 62 of the ice maker chamber 60 that is configured to mate with the ice maker chamber 60 to provide a front closure for the ice maker 20. Preferably, the ice bin 35 is removable from the ice maker chamber 60 to provide a user with access to the ice stored therein. The front cover 66 can include a hand grip recess 68 or the like to enable a user to remove the ice bin 35 from the ice maker chamber 60. In one example, the ice bin 35 can be slidably received within the ice maker chamber 60, and can be selectively removed therefrom by a user pulling outwards via the hand grip recess 68 to slide the ice bin 35 out of the ice maker chamber 60. The ice bin 35 can be partially or completely removed.

A rotatable auger 70 is positioned within the ice bin 35 and is configured to drive the ice pieces out of the ice bin 53 via a driving force F applied in a first direction. The rotatable auger 70 is driven by a motor 71 or the like, either directly or indirectly through a transmission and via a removable mechanical coupling 73 that permits removal of the ice bin 35 from the ice maker chamber 60 without removal of the motor 71. As part of the ice dispensing function, the auger 70 inside the ice bin 35 is rotated and to push ice toward the front of the ice bin 35 (e.g., towards the first end 62 of the ice maker chamber 60) via the driving force F so that it can be dispensed via the aperture 42 formed along the bottom surface of the ice bin 35 and transported to the ice chute 25 and dispenser 18. In order for ice to dispense properly, the auger 70 pushes the ice forward to the aperture 42 at a slightly higher rate than the ice actually passes through the aperture 42. In doing so, at least a portion of the driving force F is applied against an inside wall 72 towards the front of the ice bin 35. This force, along with any vibration created during dispensing, tends to push the ice bin 35 out of the ice maker chamber 60.

Thus, the ice maker 20 can further include a latch 80 configured to apply a resisting force R to the ice bin 35 along a second direction generally opposed to the first direction sufficient to counteract the driving force F. The purpose of the latch 80 is to resist the forces and vibrations resulting from operation of the auger 70 and to hold the ice bin 35 in place. It is contemplated that the resisting force R be at least sufficient to counteract the portion of the driving force F applied against the inside wall 72 of the ice bin 35 such that the ice bin 35 is not urged out of the ice maker chamber 60. However, the resisting force R can be substantially equal to or even greater than the driving force F. In one example, the driving force F and resisting force R can each be a single force. However, it is contemplated that either or both of the driving force F and resisting force R can be an effective force that results from two or more force vectors having different directions and/or magnitudes. In such a case, the resisting force R represents a resultant force magnitude that is applied to the ice bin 35 along a resultant second direction generally opposed to the resultant force magnitude of the driving force F applied in the resultant first direction, to a degree sufficient to counteract the driving force F and retain the ice bin 35 within the ice maker chamber 60.

Figure 4:
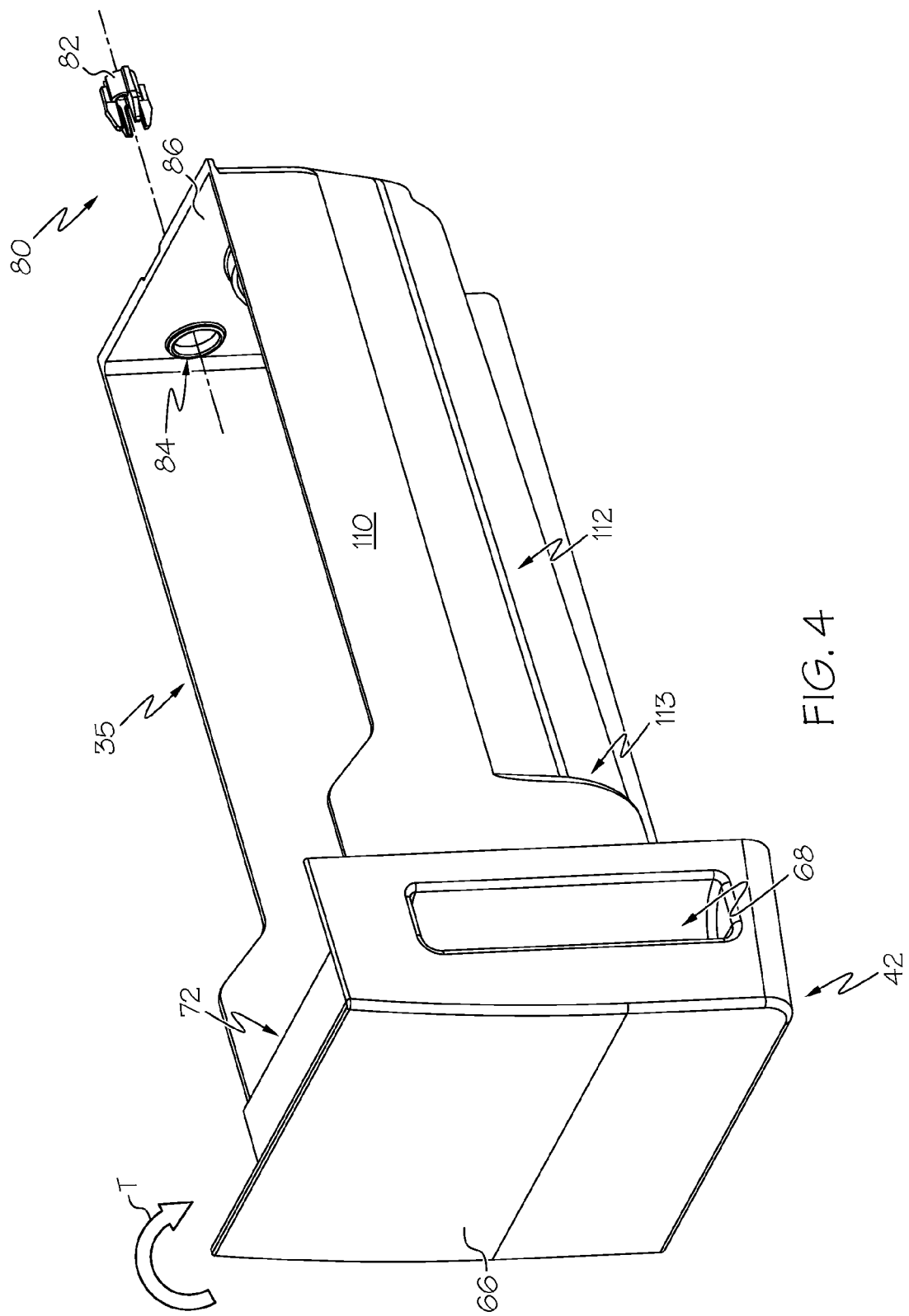
FIG. 4 is a perspective view of an example ice bin of the ice maker with an example latch.
Figure 5:
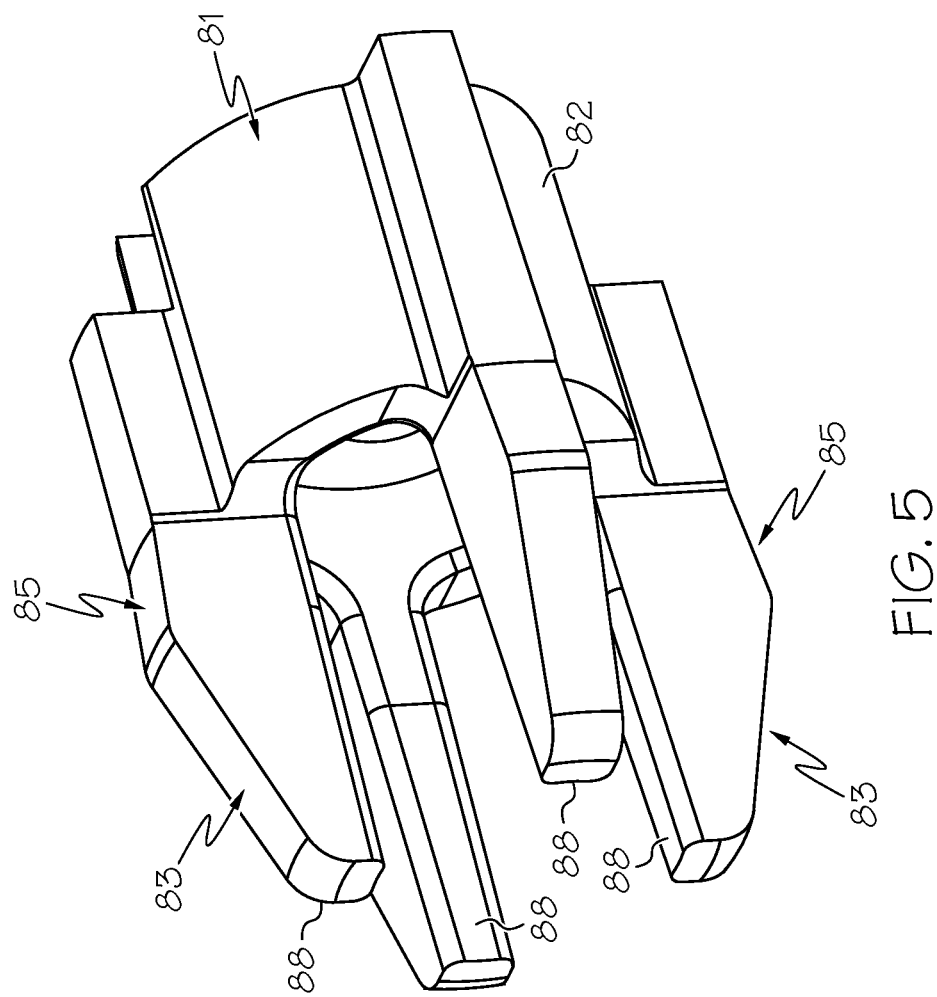
FIG. 5 is a detail perspective view of the latch of FIG. 4.

In one example, a latch pin 82 can be utilized. FIG. 4 illustrates the relative positions of the ice bin 35 and latch pin 82 as the ice bin 35 is inserted into the ice maker chamber 60. The latch pin 82 is relatively fixed in place, such as towards the second end 64 of the ice maker chamber 60. For example, a main body 81 of the latch pin 82 could be fixed to an interior surface of the ice maker chamber 60. During insertion, the ice bin 35 is pushed towards the latch pin 82 until the latch pin 82 at least partially engages a recess extending at least partially into the ice bin 35. In one example, the recess can include a through hole 84 extending through a rear wall 86 of the ice bin 35. The latch pin 82 is configured to engage the recess to apply the resisting force R to the ice bin 35 in opposition to the driving force F of the auger 70.

In one example, the latch pin 82 comprises at least one resilient finger 88 configured to engage the recess in the ice bin 35. In another example, the latch pin 82 comprises a plurality of resilient fingers 88 configured to engage the recess in the ice bin 35. Although four resilient fingers 88 are shown, various numbers of fingers can be utilized and arranged variously. The fingers can be made to be resilient in various manners. For example, the fingers can be attached to or formed together with the main body 81 of the latch pin 82 in a cantilever manner. The resilient fingers 88 are shown formed with the main body 81 using a material that will exhibit a natural flexibility and resilience, such as metal or plastic, although springs or other resilient structure can be disposed between the fingers and the main body 81.

The resilient fingers 88 are inserted through the hole 84 in the rear wall 86 of the ice bin 35. The flexible and resilient fingers 88 create a cross-sectional diameter that is slightly larger than the hole 84. When the latch pin 82 is pushed through the hole 84, the fingers 88 flex inward to fit through the hole 84. Once through, the resilient fingers 88 return to their normal shape to "lock" the ice bin 35 in place. To remove the ice bin 35 from the ice maker chamber 60, the user pulls on the ice bin 35 (e.g., via the hand grip recess 68) with a removal force sufficient to flex the fingers 88 inward so they fit through the hole 84. The resisting force R is intended to be less than the removal force applied by a user, so that the user can overcome the resisting force R to easily remove the ice bin 35 from the ice maker 20 when desired.

It is contemplated that the lead-in angles on the fingers 88 for removing the ice bin 35 can be different from the angles for inserting the ice bin 35 so that the force to remove the ice bin 35 is greater than the force to insert it. For example, at least one resilient finger 88 can include a first ramped geometry 83 configured to facilitate insertion of the resilient finger 88 into the hole 84 of the ice bin 35, and a second ramped geometry 85 configured to inhibit removal of the resilient finger 88 from the hole 84. The first ramped geometry 83 can be relatively more gradual as compared to the more abrupt second ramped geometry 85 so that the force to remove the ice bin 35 is greater than the force to insert it. For example, the second ramped geometry 85 of the resilient finger 88 can provide the resisting force R sufficient to counteract the driving force F of the auger 70. In addition or alternatively, the second ramped geometry 85 can be located relatively closer to the main body 81 as compared to the first ramped geometry 83 so as to provide relatively less mechanical advantage via a shorter moment arm so that the force to remove the ice bin 35 is greater than the force to insert it. The first ramped geometry 83 can be generally continuous with the second ramped geometry 85 along an outer surface of the resilient finger 88 such that the ice bin 35 will be "locked" into place within the ice maker chamber 60 once the resilient finger 88 is inserted far enough into the hole 84 of the ice bin 35 so that the rear wall 86 passes beyond an inflection point separating the first and second ramped geometries 83, 85. While all of the resilient fingers 88 are illustrated as having the ramped geometries, it is contemplated that any or all of the fingers can have either or both of the first and second ramped geometries 83, 85, or even additional geometries or other retention features, such as detents, projections, clips, clasps, etc. For example, such additional geometries or other retention features could be positioned about the inflection point of the resilient fingers 88, or even on or about the hole 84.

An additional benefit of the latch pin 82 is that it provides an anti-twist function to the ice bin 35. During ice crushing using an ice crusher device 74 that can be driven by the auger 70, the ice bin 35 experiences a torsional force T along its length that is related to, such as equal to, the force required to crush the ice. The ice bin 35 may not have the torsional strength to resist this force without twisting excessively. Consequently, ice bins typically have a rigid pin inserted through their back wall in a position that counteracts the twisting torsional force T. The latch pin 82 of the instant application can similarly provide the functionality of the conventional anti-twist pin while also retaining the ice bin 35 within the ice maker chamber 60. For example, while the auger 70 can be located generally centrally within the ice bin 35, the latch pin 82 can be laterally offset from a central longitudinal axis of the ice bin 35 to thereby provide increased mechanical advantage to the latch pin 82 for resisting the torsional forces applied to the ice bin 35. The lateral and/or vertical offset of the latch pin 82 with respect to the auger 70 and/or central longitudinal axis of the ice bin 35 can be defined by the force mechanics of resisting the torsional force T and/or by strength considerations of the hole 84 and/or latch pin 82, etc.

Figure 6:
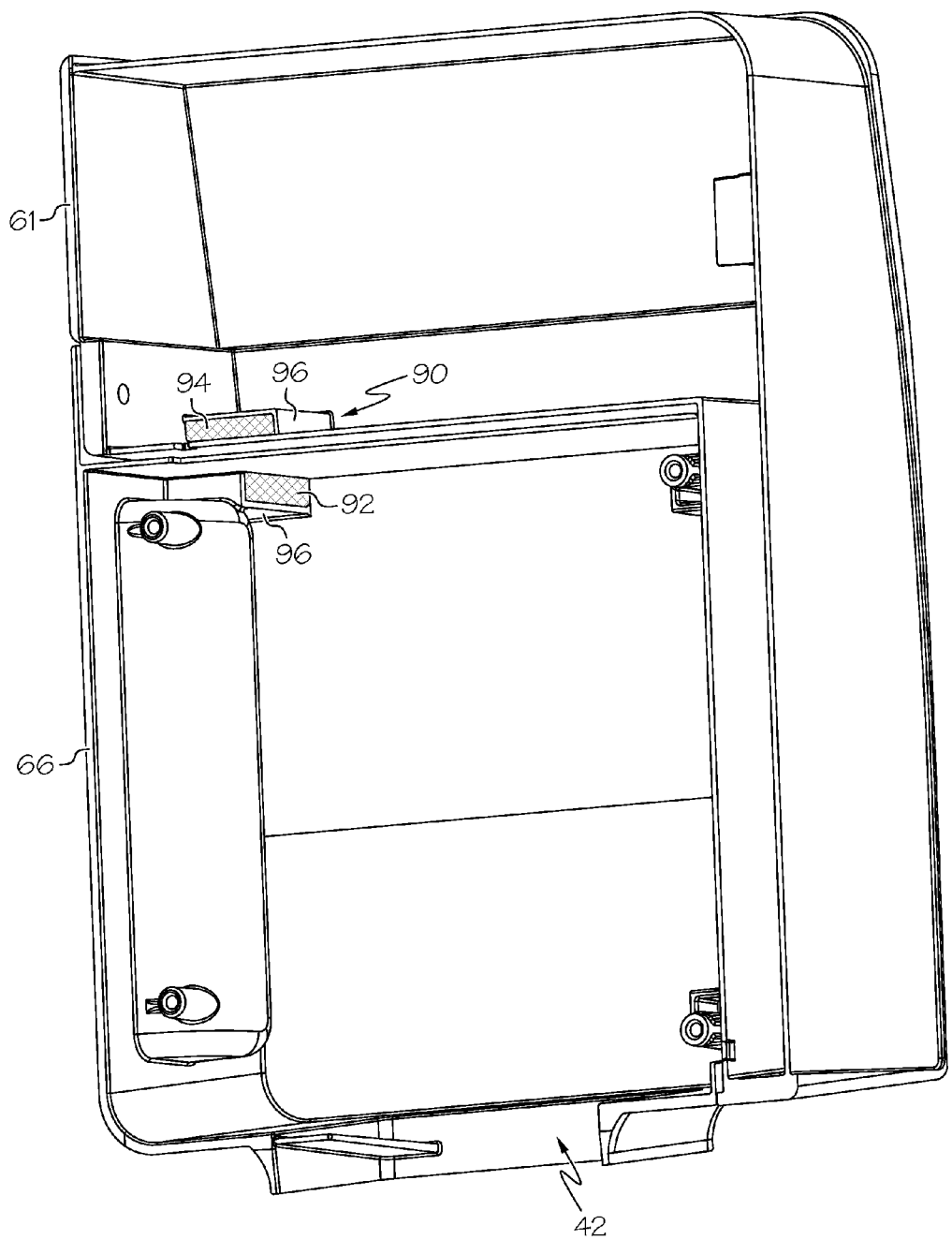
FIG. 6 is a perspective view of a front of the ice bin with another example latch.

In addition or alternatively, the latch 80 can include at least one pair of magnets 90 to maintain the ice bin 35 in a closed position. A magnetic latch can provide some or all of the benefits as described with respect to the latch pin 82, although may provide additional benefits, such as wear resistance. The magnetic latch 90 could be installed at various locations on the ice bin 35, such as towards the front, sides, or even rear thereof. In one example, as shown in FIG. 6, the magnetic latch 90 can be installed towards the front of the ice bin 35 on or near the front cover 66. FIG. 6 shows a rear view of the front cover 66 of the ice bin 35 without the remainder of the ice bin 35, for clarity, as well as the corresponding front wall 61 structure of the ice maker chamber 60. For example, the front wall 72 of the ice bin 35 could be attached to the front cover 66.

The at least one pair of magnets 90 can include a first magnet 92 attached to the ice bin 35 having a first pole, and a second magnet 94 spaced a distance from the ice bin 35 having a second pole opposite the first pole. For example, the first magnet 92 can be attached to the front cover 66 of the ice bin 35, while the second magnet 94 can be attached to the front wall 61 structure of the ice maker chamber 60. Pockets or recesses 96 can be provided where the first and second magnets 92, 94 would be installed, such that at least two magnets are positioned within magnetic force range of each other when the ice bin 35 is located in the closed (e.g., substantially fully inserted) position. Additionally, the use of such recesses 96 can facilitate repeatable manufacturing, as well as ensuring the continuing alignment of the magnets 92, 94. The magnets 92, 94 could be mechanically retained in the recesses 96 or other mounting structure, such as by clips, press fit, mechanical fasteners, etc., or could even be retained in place by adhesives, etc. The magnets 92, 94 would be placed with the opposite first and second poles facing each other so that when the ice bin 35 was inserted, the magnets would attract and hold it in place. Thus, a magnetic interaction between the first pole of the first magnet 92 and the second pole of the second magnet 94 can provide the resisting force R sufficient to counteract the driving force F of the auger 70 described herein. Further, one or more pairs of magnets can also be utilized to counteract the torsional force T described herein.

Although one pair of magnets is illustrated, it is understood that various numbers of magnets can be utilized. It is further contemplated that at least one pair of magnets could be located towards the rear of the ice bin 35, such as on the rear wall 86 thereof and the rear of the ice maker chamber 60. For example, such a pair of magnets could be located approximately where the hole 84 is illustrated. In addition or alternatively, two pairs of magnets could be used with each pair being located on different walls of the ice bin 35, such as on opposite side walls, etc. Various types of permanent magnets can be utilized, such as rare-earth magnets or the like, although other types of magnets, such as electro-magnets, could also be utilized. Multiple pairs of magnets may be utilized to provide an increased anti-twist function. Additionally, it is contemplated that both of the snap and magnetic latches could be used together to provide increased functionality or other design advantages.

The latches 80 described herein can provide additional features. In addition to the ice bin 35 retention functionality, both the snap and magnetic latches give the benefit of a hidden latch so that the front of the ice bin has a clean appearance. Additionally, neither require the user to press or push any buttons, levers, or similar things to release the ice bin 35 so it can be removed. Instead, the user simply has to pull on the ice bin 35 with enough removal force to overcome the latch 80 to be able to remove the ice bin 35.

As generally described herein, the ice maker 20 includes an ice making assembly 56 with a water tray 58 or ice mold for storing water to be frozen into the ice pieces. Turning now to FIGS. 3 and 7-11, the water tray 58 of the ice making assembly 56 is located above the ice bin 35 that stores the frozen ice pieces. The dedicated ice maker evaporator 50 is located towards the second end 64 (e.g., rear) of the ice maker chamber 60 and removes thermal energy from water in the ice mold to create the ice pieces. The ice maker evaporator 50 can be configured to be a portion of the same refrigeration loop as the system evaporator 27 that provides cooling to the fresh food and/or freezer compartments of the refrigerator. In various examples, the icemaker evaporator 50 can be provided in serial or parallel configurations with the system evaporator 27. In yet another example, the ice maker evaporator 50 can be configured as a completely independent refrigeration system.

At least one air mover 52, such as a fan, can drive airflow over the ice maker evaporator 50 to achieve a cooling effect to the water in the water tray 58 sufficient for freezing the water into ice pieces and also to the ice pieces stored in the ice bin 35 to minimize melting of those ice pieces. For example, the air mover 52 is located adjacent the second end 64 of the ice maker chamber 60 and is configured to deliver the cooled air from the ice maker evaporator 50 to a region adjacent to the ice bin 35 and water tray 58. However, although the cold air for the ice maker is created towards the second end 64 (e.g., rear) of the ice maker chamber 60, the ice dispensing aperture 42 is located towards the first end 62 (e.g., front) of the ice maker chamber 60 and is exposed to above-freezing fresh food compartment temperatures. Thus, it can be beneficial to control the airflow within the compartment such that the cold air from the ice maker evaporator 50 circulates all the way to the first end 62 (e.g., front) of the ice bin 35 to keep the ice located towards the front in a frozen condition.

Figure 7:
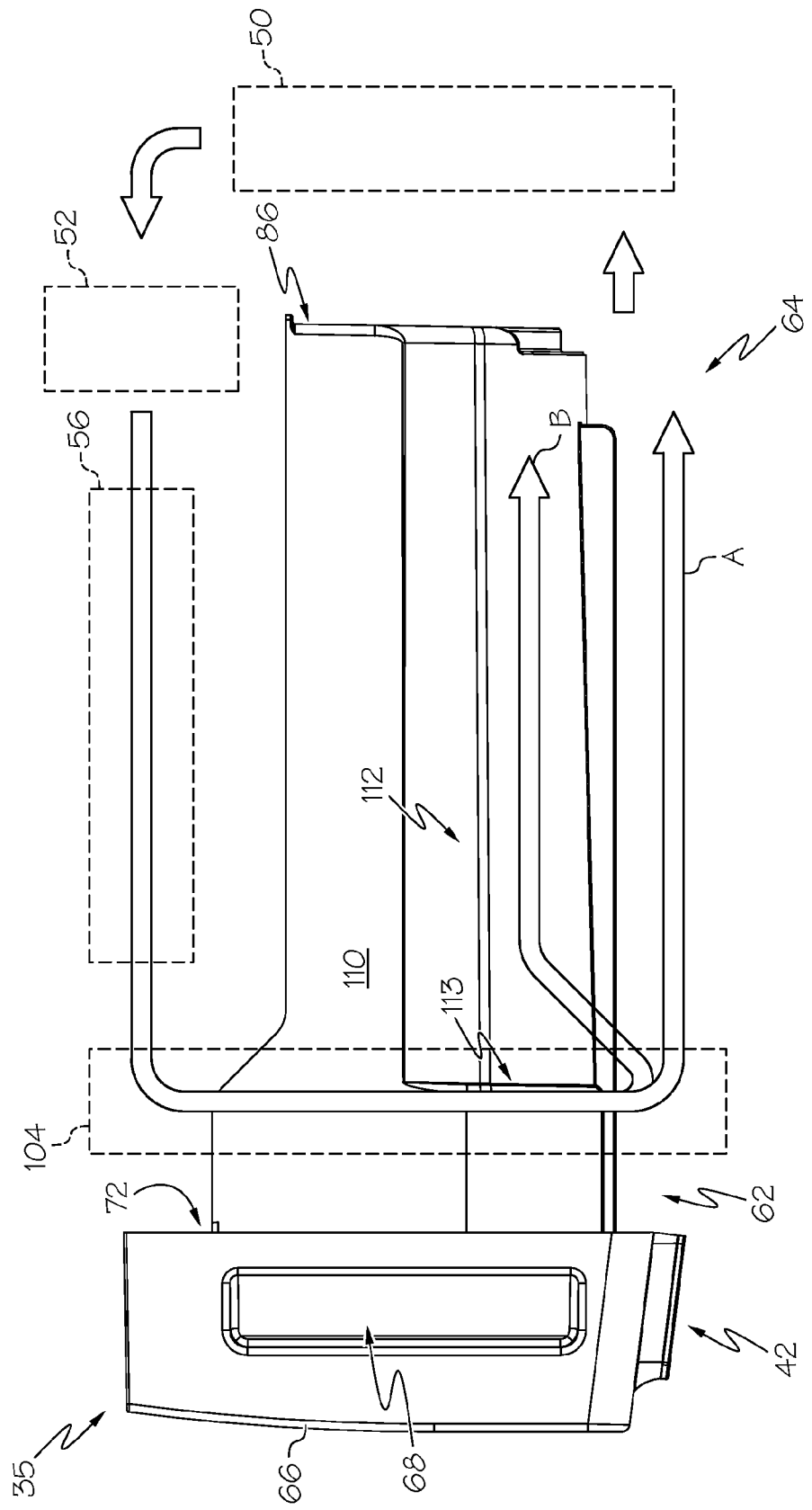
FIG. 7 is a side view of the example ice bin.

In operation, the cold air from the ice maker evaporator 50 is circulated from the second end 64 of the ice maker chamber towards the first end 62 of the ice bin 35 generally along the upper side of the ice maker chamber 60 so that the ice in both of the water tray 58 and the ice bin 35 is kept cold, preferably at or below freezing. One example air flow pathway A is illustrated in FIG. 7. Once the cool air reaches the front of the ice compartment, the air is then transferred to a space underneath the ice bin 35 and returned to the ice maker evaporator. For example, the airflow pattern A as shown can have a generally U-shaped path in which the vertex of the "U" occurs towards the first end 62 (e.g., front) of the ice maker chamber 60. This airflow pattern A enables the front of the ice bin 35 (e.g., towards the first end 62), which experiences the relatively higher heat load (e.g., adjacent the front portion exposed to the above-freezing temperatures), to be kept cold enough for all of the ice in the mold and ice bin 35. Still, various other airflow patterns could be utilized.

The cold air travels along an upper portion of the ice maker chamber 60 and ice bin 35 largely without transferring to a lower portion prior to reaching the front of the ice maker chamber 60 because the sides of the ice bin 35 fit relatively tightly with the side walls of the ice maker chamber 60. In order to encourage this airflow pattern, at least one air channel 100 can be provided on an inside surface 102 of the ice maker chamber 60 adjacent the first end 62 and extending vertically between an upper surface of the ice bin 35 towards a lower surface of the ice bin 35. The inside surface 102 can be an interior wall surface of the ice maker chamber 60. The air channel 100 can be formed into the inside surface 102, such as molded into the inside surface 102 or provided by air deflection body inserted into a recess of the inside surface 102. While the air channel 100 is illustrated extending in a straight line extending from an upper portion to a lower portion of the ice maker chamber 60, it is contemplated that the air channel 100 can have various geometries that extend generally from an upper portion to a lower portion of the ice maker chamber 60. Additionally, numerous air channels can be utilized to create one effective air channel that extends from an upper portion to a lower portion of the ice maker chamber 60.

Figure 10:
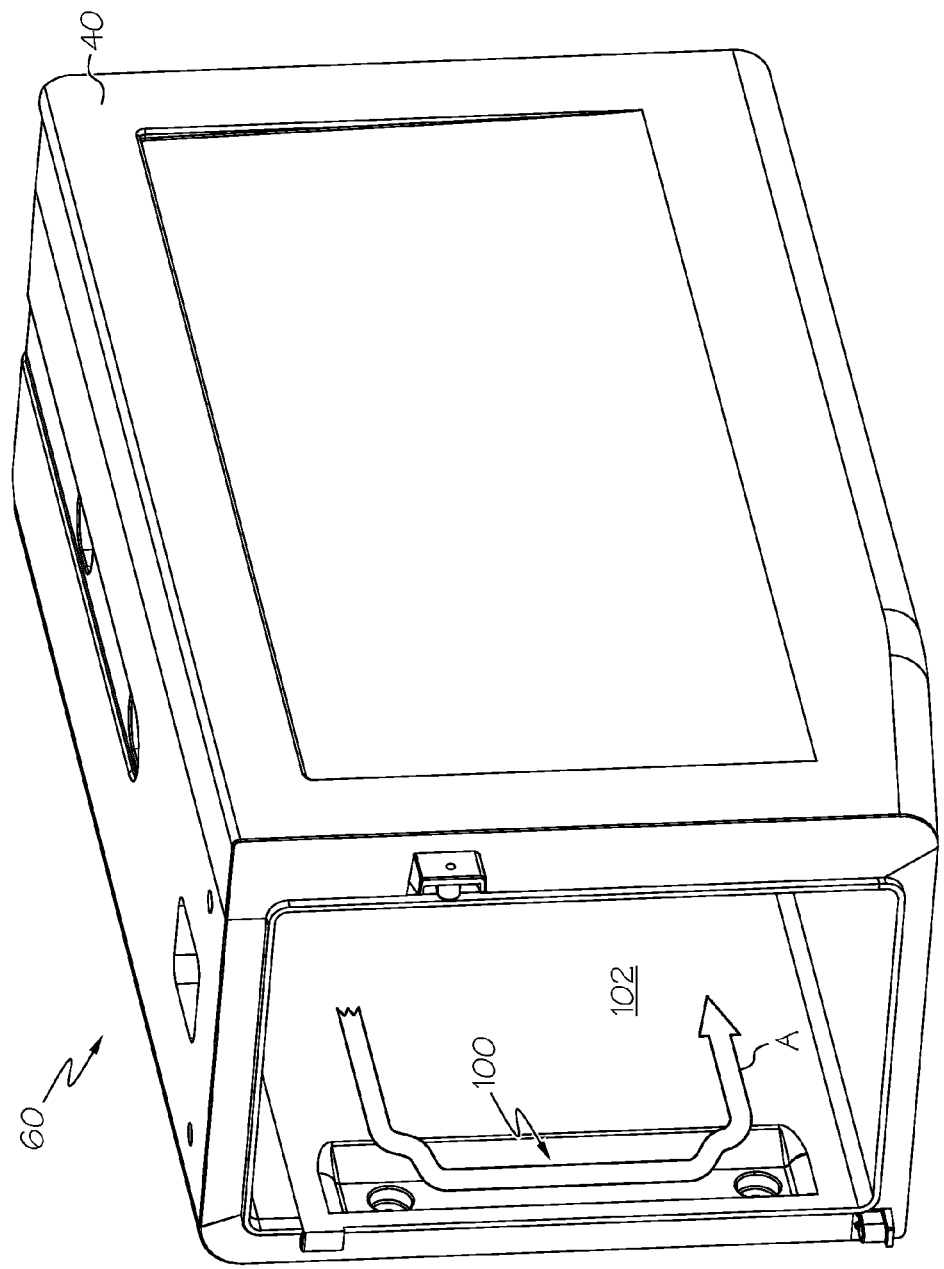
FIG. 10 is a front right perspective view of an example ice maker chamber.
Figure 11:
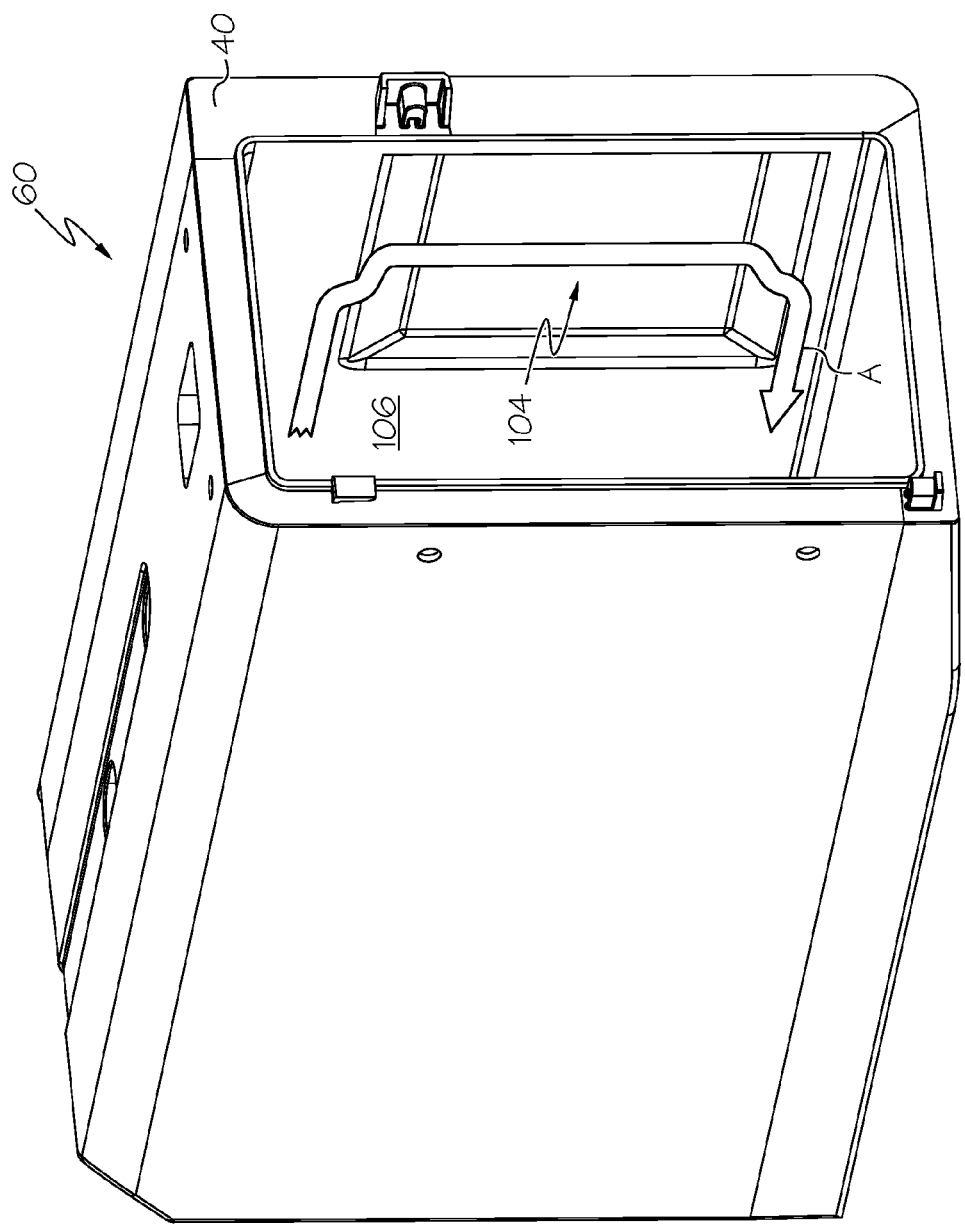
FIG. 11 is a front left perspective view of the example ice maker chamber.

Preferably, two or more channels 100, 104 are formed on the sides of the ice bin 35, with at least one airflow channel on each opposite side. For example, another air channel 104 can be provided on another inside surface 106 of the ice maker chamber 60 adjacent the first end 62 and extending vertically between an upper surface of the ice bin 35 towards a lower surface of the ice bin 35. Each of the air flow channels 100, 104 can be disposed on opposite sides of the ice bin 35, such as positioned on opposite sides of the ice maker chamber 60 as shown in FIGS. 10-11. However, any of the channels can be located at various other places, such as on the front, top, bottom, or rear walls. As illustrated by airflow pattern A, the cold air is encouraged to transition from the upper portion to the lower portion by flowing down through these air channels 100, 104, around the sides of the ice bin 35, and towards the space underneath the ice bin 35. From there, the air travels along the length of the ice bin 35 and returns to the ice maker evaporator 50 located towards the second end 64 (e.g., rear) of the ice maker chamber 60 via holes or a grate in the lower rear wall of the ice maker chamber 60 and is recycled through the ice maker evaporator 50 by the air mover 52. As a result, the ice maker assembly 56 as well as upper and lower portions of the ice bin 35, including the front portion, are cooled by the circulating cold air so that the ice pieces remain frozen.

Figure 8:
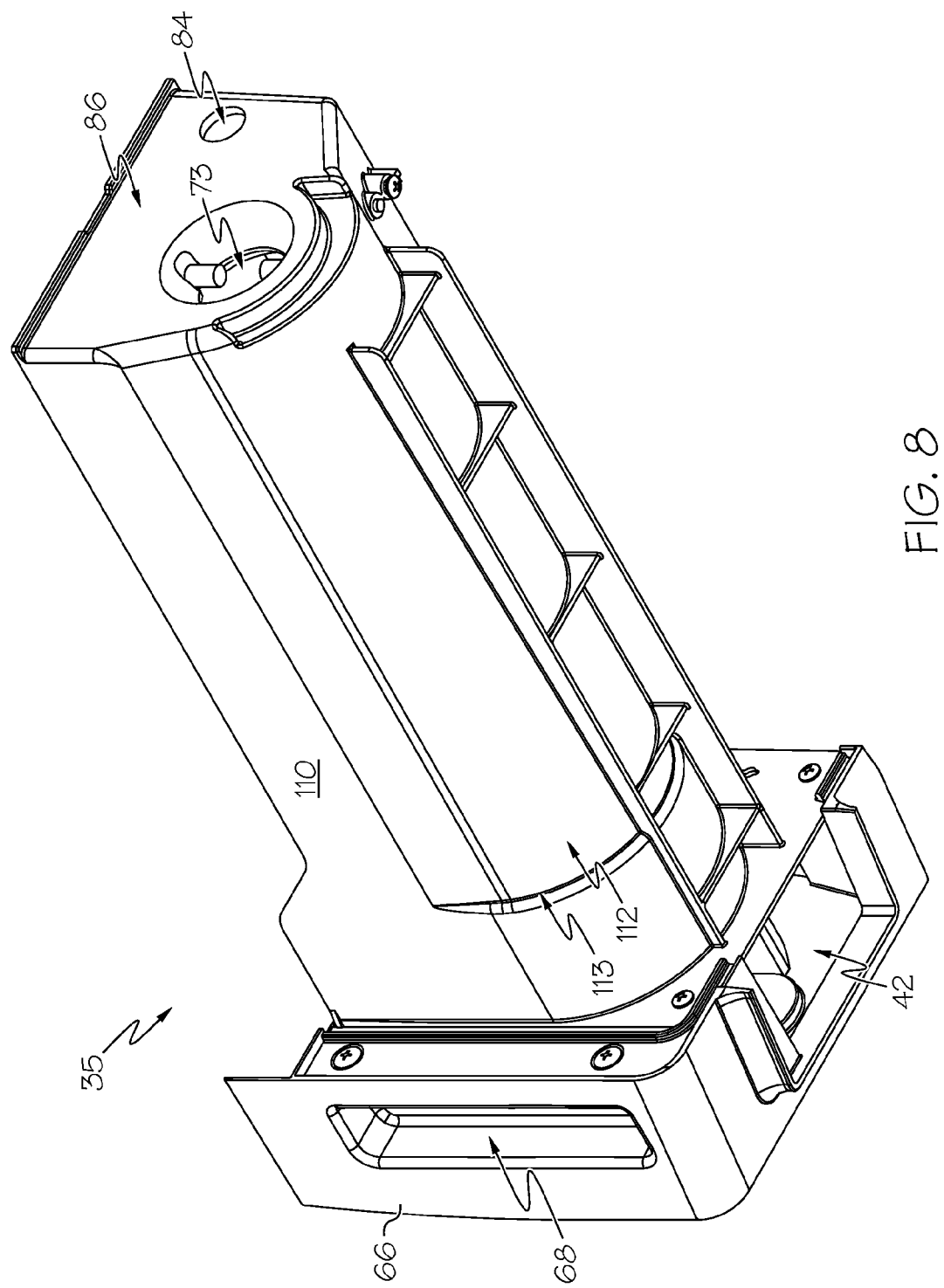
FIG. 8 is a rear perspective view of the example ice bin.
Figure 9:
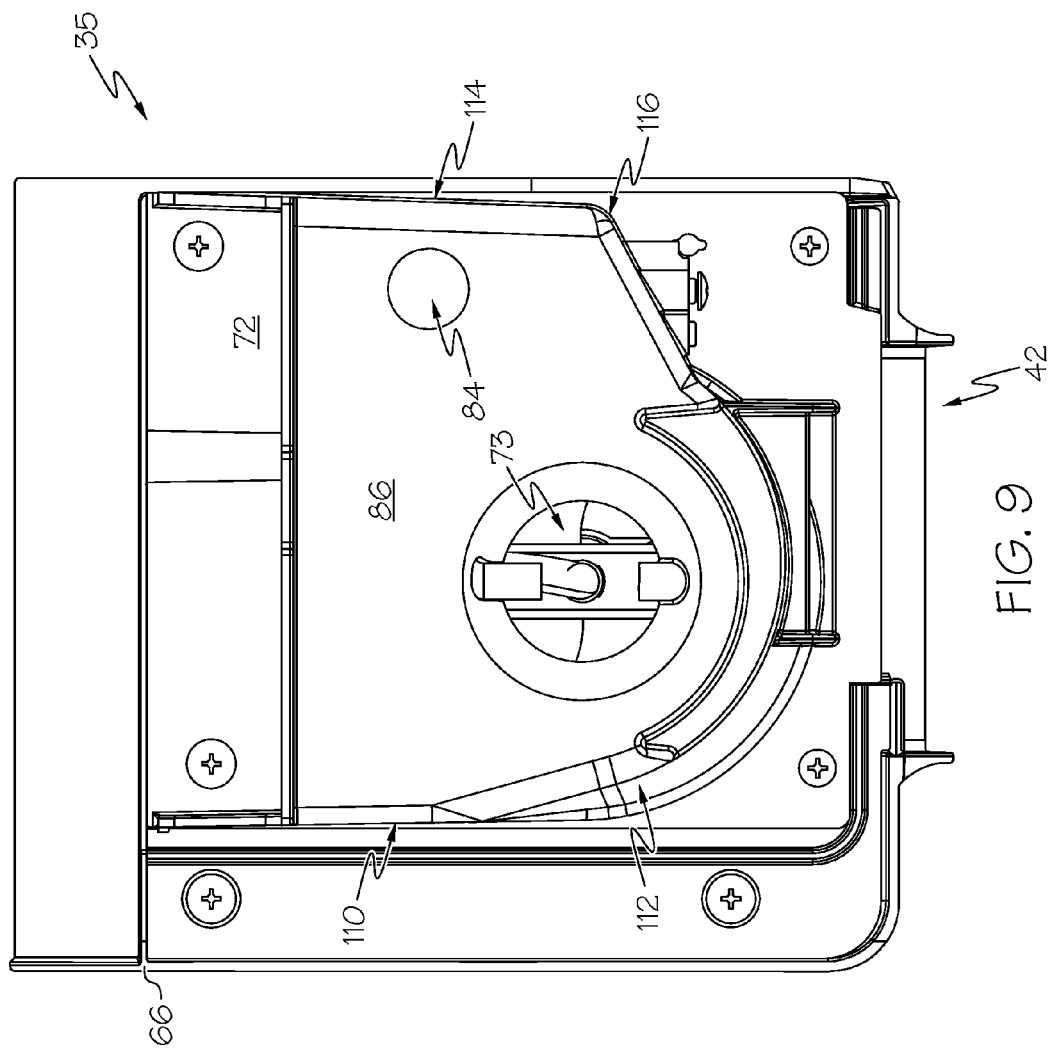
FIG. 9 is a rear view of the example ice bin.

In order to further encourage the cold air to flow along the length of the ice bin 35, a wall 110 of the ice bin 35 can further include a recessed channel 112 arranged generally adjacent to at least one air channel 100, 104 to thereby encourage airflow from the at least one air channel 100, 104 to flow underneath the ice bin 35. As shown in FIGS. 7-8, the wall 110 can be one of the side walls of the ice bin 35, or could even be one of the front or rear walls of the ice bin 35. The recessed channel 112 provides an airflow pathway that encourages the cold air flowing from the adjacent air flow channel 104 to travel along the ice bin 35. The recessed channel 112 can have various geometries and can be shaped to encourage airflow along a desired portion of the ice bin. For example, the recessed channel 112 can extend generally from the first end 62 of the ice maker chamber 60 towards the second end 64 of the ice maker chamber 60. As shown in FIG. 7, the recessed channel 112 can encourage at least a portion of the cold air to flow along airflow path B. Thus, a portion of the cold air can flow along airflow path A along the bottom of the ice bin 35, while another portion of the cold air can flow along airflow path B along the side of the ice bin 35.

Additionally, at least a portion of the recessed channel 112, such as one end 113, can be positioned to overlap at least one air channel 100, 104 so as to provide fluid communication therebetween (see FIG. 7). Similarly, the size and positioning of the at least one air channel 100, 104 can be configured to correspond to the associated recessed channel 112. For example, the air channel 104 shown in FIG. 11 can be positioned and/or along the length of the wall 106 a sufficient distance to accommodate the ice-crushing mechanism disposed at the front of the ice bin 35 and to provide fluid communication with the end 113 of the recessed channel 112. It is contemplated that either or both of the side walls of the ice bin 35 can include a recessed channel 112. In the shown drawings, such as in FIG. 9, one side wall 110 of the ice bin 35 can include the recessed channel 112 extending partially into the side wall 110 (e.g., stepped), while another side wall 114 of the ice bin 35 can provide a natural airflow pathway 116 due to the existing wall geometry of the ice bin 35. For example, the side wall 114 can angle inwards to naturally provide an increased airflow pathway 116 that would encourage the cold air flowing from the adjacent air flow channel 100 to travel around the ice bin 35. The air channel 100 can be positioned and/or extend along the length of the wall 102 a sufficient distance to accommodate to provide fluid communication with side wall 114 and natural airflow pathway 116.

An example method of operation of the ice maker 20 will now be discussed. While some method steps are discussed, it is understood that any of the method steps discussed directly or indirectly herein could also be used, as well as even other method steps. In one example, the method can include the step of introducing water into the water tray 58 of an ice maker assembly 56 disposed within a fresh-food compartment 14 of the refrigerator 10 that is configured to store food items at a temperature above zero degrees Centigrade. The method can further include the step of operating the dedicated ice maker evaporator 50 for providing air cooled to a temperature below zero degrees Centigrade to achieve a cooling effect to the water in the water tray 58 sufficient for freezing the water into ice pieces. When it is determined to harvest the ice pieces from the water tray 58 (e.g., by a timer, temperature sensor, etc.), the method can further include the step of removing the ice pieces from the water tray 58 and dumping the ice pieces into the ice bin 35 located below the ice maker assembly 56.

Occasionally during operation of the refrigerator 10, the icemaker evaporator 50 will accumulate frost thereon and require defrosting. Moisture from returning airflow can condense and freeze on portions of the icemaker evaporator 50 and/or air mover 52, causing frost to accumulate thereon. For instance, the ends of the coils provided to the icemaker evaporator 50 that are generally exposed may be among the portions of the icemaker evaporator 50 that accumulate frost. In addition or alternatively, condensate may form on some of the fan blades of the air mover 52, which may subsequently freeze and unbalance the fan or cause undesirable noise. A defrost heating element 54 can be provided at least partially about the icemaker evaporator 50, and can be activated as appropriate by the central controller provided to the refrigerator 10 to melt the frost in response to a particular condition. The defrost heating element 54 can extend along some or all or the perimeter of the icemaker evaporator 50, and can optionally extend along a substantial portion of the height of the icemaker evaporator 50 and even exceed the height of the icemaker evaporator 50.

The operation of the icemaker defrost heating element 54 can be triggered to operate in various manners. In one example, the defrost heating element 54 can be triggered based on a timer, a humidity sensor, operational history of the icemaker, opening/closing of the refrigerator doors, and/or other conditions. In another example, a temperature sensor can optionally be positioned variously within the refrigerator 10 to sense a threshold temperature indicative of the accumulation of frost. In response to sensing such a threshold temperature, the temperature sensor transmits a signal to the central controller which, in turn, activates the defrost heating element 54 until the temperature sensor no long senses the threshold temperature. According to various embodiments, the defrost heating element 54 can optionally be activated for a predetermined length of time, and the predetermined length of time can be varied based various factors.

During defrosting of the icemaker evaporator 50, the compressor can be turned off (or locked in the off state if already off when a defrost cycle begins) or even operated at a low operational setting (e.g., a variable speed compressor) to discontinue or substantially reduce the supply of refrigerant to the icemaker evaporator 50. The controller also activates the defrost heating element 54 in thermal communication with the icemaker evaporator 50 to generate heat and melt the frost accumulated on the icemaker evaporator. However, during the defrost cycle, the temperature of the icemaker evaporator 50 and adjacent structure increases due to the heat that is added by the defrost heating element 54 to remove frost buildup. Because the icemaker evaporator 50 is located near the water tray 58 and/or ice bin 35, the temperature of the ice pieces contained therein will increase as well, possibly to the point of melting. If this occurs, then the ice will clump together after the defrost cycle completes and the icemaker evaporator 50 refreezes the ice surface.

To reduce this possibility, the air mover 52 can be energized by the controller substantially continuously for a period of time before the defrost cycle begins so that the ice surface will be cooled to a sufficient amount so that it will not reach its melting temperature during the defrost cycle. In addition or alternatively, energizing the air mover 52 may cause any condensate on the fan blades to be blown off. In one example, the method can further include the step of operating the air mover 52 for a predetermined amount of time for delivering the air cooled by the ice maker evaporator to at least one of the water tray 58 and the ice bin 35. The method can further include the step of subsequently stopping operation of the air mover 52 and operating the defrost heating element 54 to thereby melt frost accumulated on the surface of the ice maker evaporator.

For example, the icemaker fan may be run substantially continuously for a period of 10 minutes, 20 minutes, 30 minutes, or other shorter or longer amount of time prior to operating the defrost heating element 54. The air mover 52 could be operated at approximately 100% duty cycle during the predetermined amount of time, or could even be pulsed on and off as desired. In addition or alternatively, after the defrost cycle completes, the icemaker fan can be energized substantially continuously (e.g., approximately 100% duty cycle or even pulsing) for another period of time (e.g., 10 minutes, 20 minutes, 30 minutes, or other amount) to quickly reduce the ice surface temperature again to reduce the possibility of ice clumping. The time period for either or both of the pre-defrost or post-defrost fan operations can be similar or different, and/or fixed or dynamic. In one example, the pre-defrost and post-defrost fan operations can be fixed at 30 minutes each. In another example, either or both of the pre-defrost and post-defrost fan operations can be operated for changing time periods based on pre-determined conditions or even dynamically calculated values based on sensed conditions in the refrigerator or icemaker compartment, such as timers, humidity, temperatures, door-open cycles, ice-ice bin open cycles, ice making cycles, etc.

Thus, one example method of operation could include the steps of operating the air mover 52 for a predetermined amount of time, subsequently stopping operation of the air mover 52 for delivering the cooled air to at least one of the water tray 58 and the ice bin 35, and then operating the defrost heating element 54 to thereby melt frost accumulated on the surface of the ice maker evaporator. After the defrost cycle is complete, the method can include the steps of stopping operation of the defrost heating element 54, then restarting operation of the ice maker evaporator 50 to provide cooled air to the ice maker 20, and then subsequently restarting operation of the air mover 52 for a second predetermined amount of time for delivering the cooled air to at least one of the water tray 58 and the ice bin 35. It is contemplated that where the icemaker evaporator 50 is arranged in series with the system evaporator 27, stopping and starting operation of either evaporator will also stop/start operation of the other. However, where the icemaker evaporator 50 is arranged in parallel with the system evaporator 27, stopping and starting the icemaker evaporator 50 could be accomplished via opening or closing a valve or the like. Where the icemaker evaporator 50 is independent of the system evaporator 27, stopping and starting the icemaker evaporator 50 could be accomplished by valves or even by controlling operation of the associated refrigerant compressor. Finally, where a variable-speed refrigerant compressor is used, it is understood that "stopping" operation of the compressor may be accomplished by operating the compressor at a low, such as the lowest, operational setting above deactivation to substantially reduce the flow of refrigerant. Still, the compressor could also be completely deactivated.

The invention has been described with reference to the example embodiments described above. Modifications and alterations will occur to others upon a reading and understanding of this specification. Examples embodiments incorporating one or more aspects of the invention are intended to include all such modifications and alterations insofar as they come within the scope of the appended claims.

What is claimed is:

1. A refrigeration appliance comprising:
    a fresh food compartment for storing food items in a refrigerated environment having a target temperature above zero degrees Centigrade;
    a freezer compartment for storing food items in a sub-freezing environment having a target temperature below zero degrees Centigrade;
    an ice maker disposed within the fresh food compartment for freezing water into ice pieces, the ice maker comprising a removable ice bin with an interior volume defined between a front cover and a plurality of walls for storing the ice pieces produced by the ice maker, the ice bin further comprising an ice dispensing aperture sized for the ice pieces to pass therethrough;
    a rotatable auger positioned within the ice bin and configured to drive the ice pieces through the ice dispensing aperture and out of the ice bin via a driving force applied in a first direction,
    wherein the rotatable auger extends along a longitudinal axis; and
    a latch configured to apply a resisting force to the ice bin along a second direction generally opposed to the first direction sufficient to counteract the driving force, wherein the resisting force is less than a removal force applied by a user to remove the ice bin from the ice maker,
    wherein the latch comprises a latch pin with at least one resilient finger that projects at least partially into the interior volume of the ice bin via a through hole extending through one of the plurality of walls of the ice bin, and the at least one resilient finger is biased into contact with the through hole to provide the resisting force,
    the at least one resilient finger comprising a first ramped geometry extending along a first angle relative to the longitudinal axis of the auger that facilitates insertion into the through hole of the ice bin, and a second ramped geometry extending along a second angle relative to the longitudinal axis of the auger that inhibits removal from the through hole, the second angle being less than the first angle so that the user can overcome the resisting force to remove the ice bin from the ice maker,
    wherein the latch pin and through hole are located spaced apart from the front cover and ice dispensing aperture of the ice wherein the distance between the first ramped geometry and the front cover is less than the distance between the second ramped geometry and the front cover when the ice bin is positioned within the fresh food compartment.

2. The refrigeration appliance of claim 1, wherein the through hole extends through a rear wall of the ice bin, the rear wall being one of the plurality of walls that is located opposite from the front cover.

3. The refrigeration appliance of claim 1, wherein the latch pin comprises a plurality of resilient fingers configured to project into the through hole in the ice bin.

4. The refrigeration appliance of claim 1, wherein the second ramped geometry of the at least one resilient finger provides the resisting force sufficient to counteract the driving force of the auger.

5. The refrigeration appliance of claim 1, wherein a second latch comprises at least one pair of magnets.

6. The refrigeration appliance of claim 5, wherein the at least one pair of magnets comprises a first magnet attached to the ice bin having a first pole and a second magnet spaced a distance from the ice bin having a second pole opposite the first pole.

7. The refrigeration appliance of claim 6, wherein a magnetic interaction between the first pole of the first magnet and the second pole of the second magnet provides at least a portion of the resisting force sufficient to counteract the driving force of the auger.

8. The refrigeration appliance of claim 1, wherein the freezer compartment is disposed at an elevation vertically below the fresh food compartment.

9. The refrigeration appliance of claim 1, wherein the latch pin comprises a main body and the at least one resilient finger is attached to or formed together with the main body in a cantilever manner.

10. The refrigeration appliance of claim 1,
wherein the at least one resilient finger is movable between a naturally extended position and an inwardly deflected position,
wherein at the naturally extended position the at least one resilient finger has a cross-sectional diameter that is larger than a cross-sectional diameter of the through hole, and
wherein at the inwardly deflected position the at least one resilient finger has a cross-sectional diameter that is substantially equal to or less than the cross-sectional diameter of the through hole.

11. The refrigeration appliance of claim 10, wherein in order to remove the ice bin from the ice maker, the removal force applied by the user is sufficient to flex the at least one resilient finger to the inwardly deflected position.

12. The refrigeration appliance of claim 1, wherein the first ramped geometry extends along a first length and the second ramped geometry extends along a second length that is shorter than the first length, whereby the first ramped geometry is relatively more gradual and the second ramped geometry is relatively more abrupt so that the removal force to remove the ice bin is greater than a force to insert the latch pin into the through hole.

13. The refrigeration appliance of claim 1, wherein the latch pin comprises a main body, and wherein the second ramped geometry is located relatively closer to the main body than the first ramped geometry so that the removal force to deflect the at least one resilient finger when removing the ice bin is greater than a force to insert the latch pin into the through hole.

14. A refrigeration appliance comprising:
a fresh food compartment for storing food items in a refrigerated environment having a target temperature above zero degrees Centigrade;
a freezer compartment for storing food items in a sub-freezing environment having a target temperature below zero degrees Centigrade;
an ice maker disposed within the fresh food compartment for freezing water into ice pieces, the ice maker comprising a removable ice bin with an interior volume defined between a front cover and an opposite rear wall for storing the ice pieces produced by the ice maker;
a rotatable auger positioned within the ice bin, attached to the rear wall and extending along a longitudinal axis within the ice bin, and configured to drive the ice pieces towards the front cover via a driving force applied in a first direction and out of the ice bin through an ice discharge chute; and
a latch comprising a latch pin with at least one resilient finger that projects at least partially into the interior volume of the ice bin via a through hole extending through the rear wall of the ice bin,
wherein the at least one resilient finger is biased into contact with the through hole and comprises a first ramped geometry extending along a first angle relative to the longitudinal axis of the auger that facilitates insertion into the through hole of the ice bin, and a second ramped geometry extending along a second angle relative to the longitudinal axis of the auger that is less than the first angle to inhibit removal of the at least one resilient finger from the through hole to thereby provide a resisting force to the ice bin along a second direction generally opposed to the first direction sufficient to counteract the driving force of the auger,
wherein the resisting force is less than a removal force applied by a user so that the user can remove the ice bin from the ice maker; and wherein the distance between the first ramped geometry and the front cover is less than the distance between the second ramped geometry and the front cover when the ice bin is positioned within the fresh food compartment.

15. The refrigeration appliance of claim 1, wherein the ice bin experiences a torsional force caused by rotation of the auger, and
wherein the latch pin is laterally offset from the longitudinal axis of the auger so that the latch pin acts as an anti-twist pin that resists the torsional force applied to the ice bin.

* * * * *

UNITED STATES PATENT AND TRADEMARK OFFICE
CERTIFICATE OF CORRECTION

PATENT NO. : 9,234,690 B2
APPLICATION NO. : 13/755216
DATED : January 12, 2016
INVENTOR(S) : McCollough et al.

Page 1 of 1

It is certified that error appears in the above-identified patent and that said Letters Patent is hereby corrected as shown below:

In the specification:

Column 16, line 63: please delete the word "ice" and replace it with --ice bin; and--

Signed and Sealed this
Twelfth Day of July, 2016

Michelle K. Lee
*Director of the United States Patent and Trademark Office*